Ishikawa et al.

[11] Patent Number: 4,500,619
[45] Date of Patent: Feb. 19, 1985

[54] ELECTROPHOTOGRAPHIC PHOTOSENSITIVE MEMBER WITH OXADIAZOLE CONTAINING DISAZO COMPOUND

[75] Inventors: Shozo Ishikawa, Sayama; Kazuharu Katagiri, Mitaka; Katsunori Watanabe, Yamato; Kiyoshi Sakai, Mitaka; Makoto Kitahara, Yokohama, all of Japan

[73] Assignees: Copyer Kabushiki Kaisha; Canon Kabushiki Kaisha, both of Tokyo, Japan

[21] Appl. No.: 591,909

[22] Filed: Mar. 22, 1984

Related U.S. Application Data

[63] Continuation of Ser. No. 395,323, Jul. 6, 1982, abandoned.

[30] Foreign Application Priority Data

Jul. 22, 1981 [JP] Japan .................. 56-113563

[51] Int. Cl.³ ............................ G03G 5/06; G03G 5/14
[52] U.S. Cl. ......................................... 430/59; 430/58; 430/77; 430/78; 430/79; 534/560; 534/655; 534/759; 534/797
[58] Field of Search ..................... 430/58, 59, 77, 78, 430/79; 260/157, 164

[56] References Cited

U.S. PATENT DOCUMENTS 4,356,243  10/1982  Ishikawa et al. .............. 430/77 X

FOREIGN PATENT DOCUMENTS 41392   12/1981  European Pat. Off. ............ 430/77
2659708  7/1978  Fed. Rep. of Germany ...... 260/157
55-82160  6/1980  Japan ............................ 430/77

*Primary Examiner*—Roland E. Martin
*Attorney, Agent, or Firm*—Fitzpatrick, Cella, Harper & Scinto

[57] ABSTRACT

An electrophotographic photosensitive member comprises a layer containing at least one disazo pigment represented by the formula:

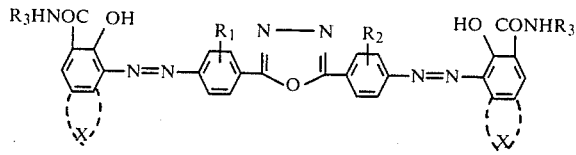

wherein $R_1$ and $R_2$ each represent hydrogen, halogen, lower alkyl or lower alkoxy; $R_3$ represents methyl, ehtyl or $C_3$–$C_{10}$ linear alkyl; and X represents a residue necessary to complete an aromatic hydrocarbon ring or heterocyclic ring, substituted or unsubstituted.

11 Claims, No Drawings

ELECTROPHOTOGRAPHIC PHOTOSENSITIVE MEMBER WITH OXADIAZOLE CONTAINING DISAZO COMPOUND

This application is a continuation of application Ser. No. 395,323 filed July 6, 1982, now abandoned.

BACKGROUND OF THE INVENTION

1. Field of the Invention

This invention relates to electrophotographic photosensitive members and more particularly to an electrophotographic photosensitive member containing a specific disazo pigment.

2. Description of the Prior Art

Photosensitive members containing an inorganic photoconductive material such as selenium, cadmium, sulfide, or zinc oxide have so far been widely used for electrophotography.

On the other hand, various organic photoconductive materials for use in electrophotographic photosensitive members are known including typical photoconductive polymer poly(N-vinylcarbazole), low molecular weight organic photoconductive materials such as 2,5-bis(p-diethylaminophenyl)-1,3,4-oxadiazole, and further combinations of such organic photoconductive material with various kinds of dyes or pigments.

Since an electrophotographic photosensitive material comprising an organic photoconductive material is excellent in film-forming capability and is produced by coating, the organic electrophotographic photosensitive member can be produced with high productivity and inexpensively. Color sensitivity of the photosensitive members can be freely controlled by selecting dyes or pigments to be used. Having such advantages, photosensitive members of various organic photoconductive materials have been investigated extensively. Known pigments for this purpose include disazo pigments, for example, disclosed in U.S. Pat. No. 4,251,613 (Japanese Patent Kokai No. 12742/1979) and Japanese Patent Kokai Nos. 145142/1979 and 82160/1980. However, photosensitive members employing the known pigments are disadvantageous in sensitivity and durability, so that very few of them have been put into practical use.

SUMMARY OF THE INVENTION

An object of this invention is to provide an electrophotograhic photosensitive member containing a specific disazo pigment.

Another object of this invention is to provide an electrophotographic photosensitive member of high sensitivity.

A further object of this invention is to provide an electrophotographic photosensitive member of high durability.

These objects of this invention can be achieved with disazo pigments represented by the formula (I)

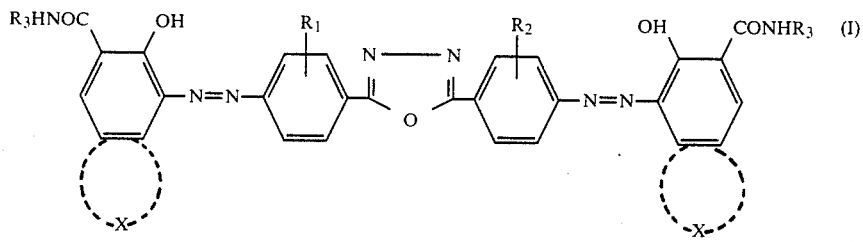

wherein $R_1$ and $R_2$ each represent hydrogen, halogen, lower alkyl, or lower alkoxy; $R_3$ represents methyl, ethyl, or $C_3$–$C_{10}$ linear alkyl; and X represents a residue necessary to complete an aromatic hydrocarbon ring or heterocyclic ring, each being substituted or unsubstituted.

DETAILED DESCRIPTION OF THE PREFERRED EMBODIMENTS OF THE INVENTION

The disazo pigment of this invention is represented by formula (I).

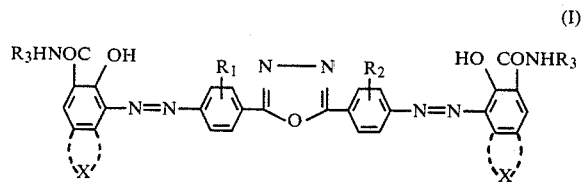

In formula (I), $R_1$ and $R_2$ each represent hydrogen; halogen such as chlorine, bromine, or iodine; lower alkyl such as methyl, ethyl, propyl or butyl; or lower alkoxy such as methoxy, ethoxy, propoxy, or butoxy; $R_3$ represents methyl, ethyl, or $C_3$–$C_{10}$ linear alkyl, i.e., n-propyl, n-butyl, n-amyl, n-hexyl, n-heptyl, n-octyl, n-nonyl or n-decyl; and X represents a residue necessary to complete, together with the carbon atoms to which it is linked, an aromatic hydrocarbon ring such as benzene ring or naphthalene ring or a heterocyclic ring such as indol ring, carbazole ring, or benzofuran ring, where said ring may also substituted by lower alkyl such as methyl, ethyl, propyl or butyl, by lower alkoxy such as methoxy, ethoxy, propoxy or butoxy, or by halogen such as chlorine, bromine or iodine.

Typical examples of the disazo pigments of this invention are listed below.

| Pigment No. | Formula |
|---|---|
| 1. | H₃C—HNOC, OH, N—N, OH, CONH—CH₃ (bis-azo naphthol with 1,3,4-oxadiazole bridging two phenyl groups) |
| 2. | H₅C₂—HNOC, OH, N—N, OH, CONH—C₂H₅ |
| 3. | (n)H₇C₃—HNOC, OH, N—N, OH, CONH—C₃H₇(n) |
| 4. | (n)H₉C₄—HNOC, OH, N—N, OH, CONH—C₄H₉(n) |
| 5. | H₃C—HNOC, OH, CH₃, N—N, CH₃, OH, CONH—CH₃ |
| 6. | H₅C₂—HNOC, OH, CH₃, N—N, CH₃, OH, CONH—C₂H₅ |
| 7. | H₃C—HNOC, OH, Cl, N—N, Cl, OH, CONH—CH₃ |

-continued
| Pigment No. | Formula |
|---|---|
| 8. | 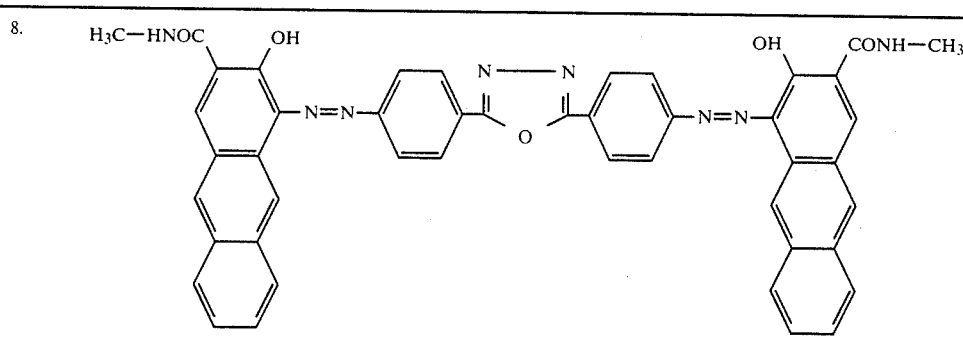 |
| 9. | 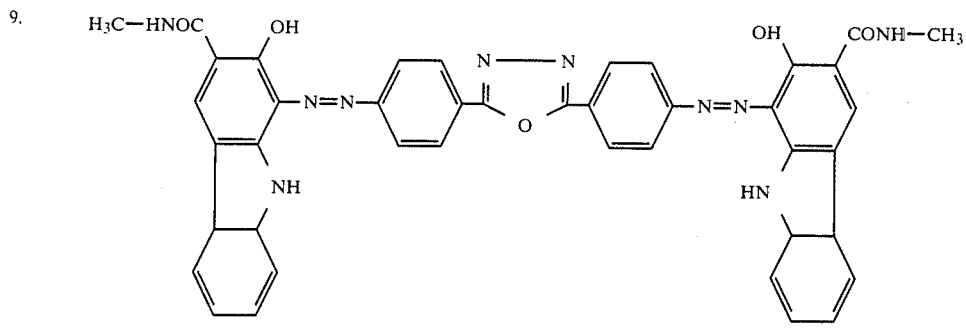 |
| 10. | 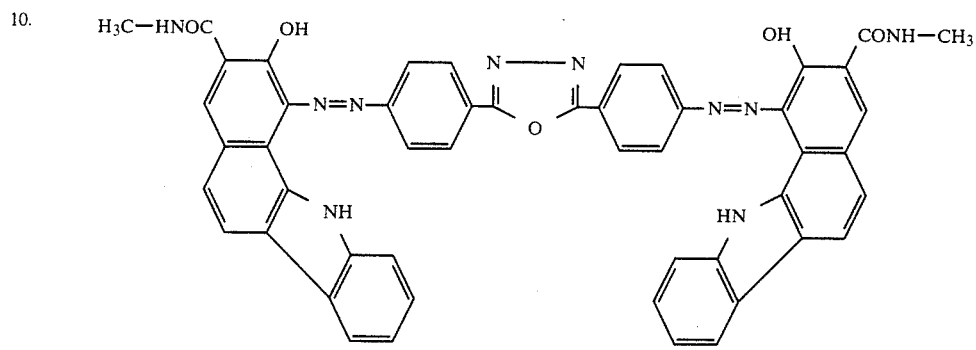 |
| 11. | 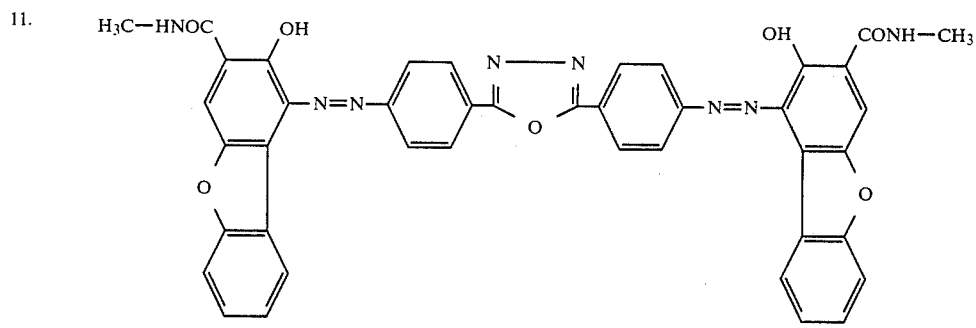 |
| 12. | 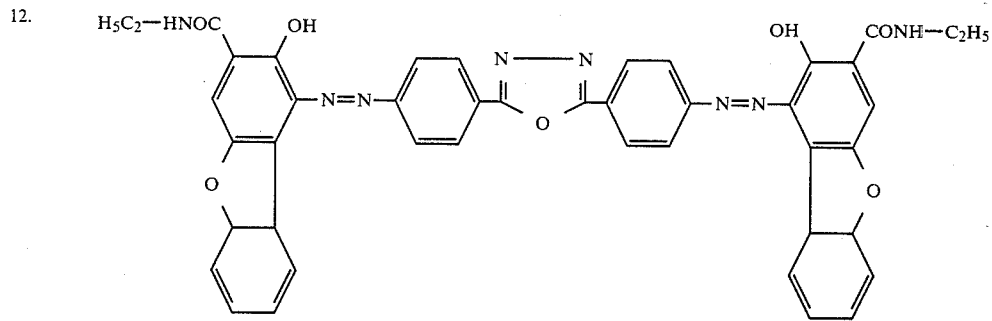 |

| Pigment No. | Formula |
|---|---|
| 13. | 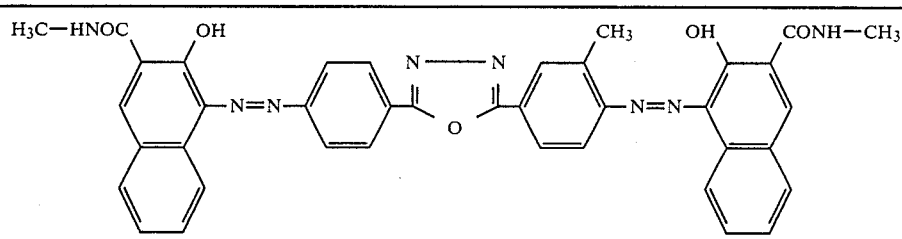 |
| 14. | 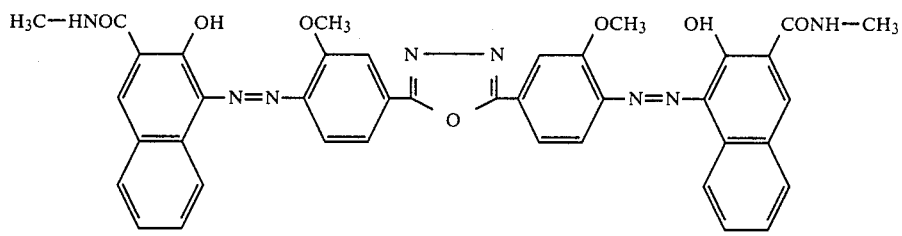 |
| 15. | 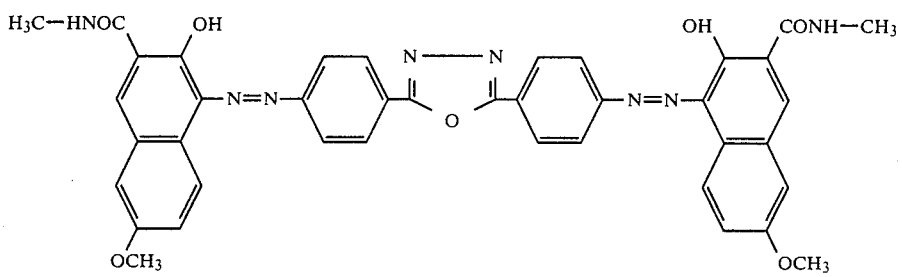 |
| 16. | 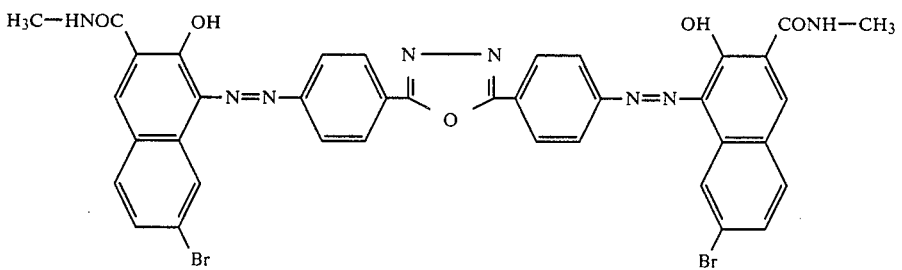 |

These disazo pigments are characterized by having a structure of N-methylamide, N-ethylamide or amide substituted by $C_3$–$C_{10}$ linear alkyl in each of their coupler components. Such 1,3,4-oxadiazole-skeletal disazo pigments having said alkylamide structure in each coupler component give electrophotographic photosensitive members superior in sensitivity and durability to those given by other disazo pigments having a benzamide structure in each coupler component, as disclosed in the above-cited references, U.S. Pat. No. 4,251,613 and Japanese Patent Kokai Nos. 145142/1979 and 82160/1980. In particular, when the alkylamide is an N-(lower linear alkyl)-amide such as N-methyl amide, N-ethylamide, N-n-propylamide or N-n-butylamide, preferably N-methylamide or N-ethylamide, the resulting photosensitive members are excellent in sensitivity and durability.

Disazo pigments represented by formula (I) are readily prepared by the ordinary tetrazotization of starting compound diamines represented by the formula

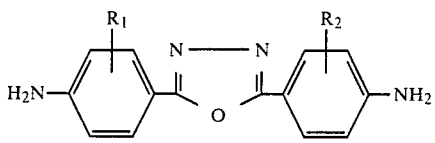

wherein $R_1$ and $R_2$ are as defined above, followed by coupling with couplers represented by

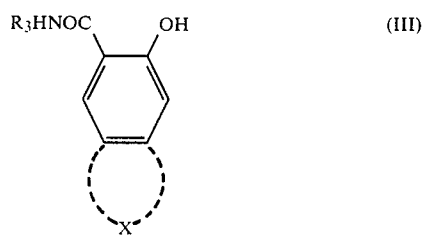

wherein $R_3$ and X are as defined above, or followed by coupling the tetrazonium salts after isolation thereof in a form of fluoroborate or of double salt with zinc chloride, with said couplers in a suitable solvents, for example, N,N-dimethylformamide or dimethylsulfoxide, in the presence of an alkali.

Examples of the electrophotographic photosensitive member having an organic pigment containing layer on its conductive layer are as follows:

(1) As disclosed in Japanese Patent Publication No. 1667/1977, a layer of dispersion of pigment in a binder is laid on a conductive layer.

(2) As disclosed in Japanese Patent Publication No. 18545/1972 (U.S. Pat. No. 3,870,516) and Japanese Patent Kokai No. 30328/1972 (U.S. Pat. No. 3,894,868), a layer of dispersion of pigment in a charge-transporting material or in a charge transporting-medium comprising a charge-transporting material and an insulating binder (the medium may only comprises an insulating binder acting itself as a charge-transporting material) is laid on a conductive layer.

(3) As disclosed in Japanese Patent Kokai No. 105537/1974 (U.S. Pat. No. 3,837,851), a photosensitive member comprises a conductive layer, charge generation layer containing an organic pigment, and charge transporting layer.

(4) As disclosed in Japanese Patent Kokai No. 91648/1974, a photosensitive member comprises a layer containing an organic pigment in a charge-transfer complex.

The disazo pigment of this invention, though applicable to any of the above types of photosensitive member, is desirable to use for the types (2), (3) and (4), for the purpose of enhancing the transport efficiency of charge carriers generated by light absorption in the disazo pigment of formula (I). The application of the present disazo pigment to the type (3) of photosensitive member wherein the charge carrier generating and transporting functions are separated is most desirable for making the most of characteristics of this pigment.

Accordingly, referring now to the type (3) of electrophotographic photosensitive member, more detailed description is given.

It is essential that this type of photosensitive member has a layer construction comprising a conductive layer, a charge generation layer, and a charge transport layer. While the charge generation layer may be laid either on the upper or lower side of the charge transport layer, a type of photosensitive member for repeated uses is preferred to have a layer construction laminated in order of conductive layer, charge generation layer, and charge transport layer from bottom to top, in view chiefly of the mechanical strength and occasionally of the chargeability. A bond layer can be laid between the conductive layer and the charge generation layer, if necessary.

Materials for use as the conductive layer include aluminum or other metal plates or foils, aluminum—or other metal-metallized plastic films, aluminum foil—laminated paper, conductivized paper, etc.

Materials effective for use as the bond layer include resins such as casein, poly(vinyl alcohol), water-soluble acrylic acid-ethylene copolymer, nitrocellulose, etc. Suitable thickness of the bond layer is 0.01 to 5$\mu$, particularly 0.05 to 3$\mu$.

The charge generation layer is formed on the conductive layer or on the bond layer formed thereupon, by coating and drying a dispersion of a finely devised disazo pigment of formula (I) without using a binder or coating and drying the finely devised disazo pigment dispersed in a suitable binder solution, if necessary. For dispersing the disazo pigment, known means such as ball mills and attritors are available, whereby particle sizes of the pigment are reduced to 5$\mu$ or less, more suitably 2$\mu$ or less, and most suitably 0.5$\mu$ or less.

The disazo pigment can also be coated in the form of solutions in amines such as ethylenediamine, and the like.

For the coating, usual methods are used such as blade coating, Meyer bar coating, spray coating, and dip coating.

Thickness of the charge generation layer is generally up to 5$\mu$, preferably 0.01 to 1$\mu$. When a binder is used for the charge generation layer, its content in the layer is desirably up to 80%, preferably up to 40%, by weight, because excessive binder contents have an adverse effect on the sensitivity.

Binders used herein include various resins such as poly(vinyl butyral), poly(vinyl acetate), polyesters, polycarbonates, phenoxy resin, acrylic resins, polyacrylamides, polyamides, polyvinylpyridine, cellulosic resins, urethane resins, epoxy resins, casein, poly(vinyl alcohol), and the like.

The charge transport layer is laid on the charge generation layer thus formed. The charge transport layer is formed by coating and drying a charge-transporting material in usual ways, after dissolving it in a suitable binder solution if it has no film-forming capability.

The charge-transporting materials are classified into electron-transporting materials and hole-transporting materials.

The electron-transporting materials, include electron attractive substances such as chloranil, bromanil, tetracyanoethylene, tetracyanodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone, and polymers derived from these compounds.

The hole-transporting materials include pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine; hydrazones such as p-diethylaminobenzaldehyde-N,N-diphenylhydrazone, p-diethylaminobenzaldehyde-N-α-naphthyl-N-phenylhydrazone, p-(1-pyrrolidinyl)-benzaldehyde-N,N-diphenylhydrazone, 1,3,3-trimethylindolenine-ω-aldehyde-N,N-diphenylhydrazone, and p-diethylbenzaldehyde-3-methylbenzthiazolinone-2-hydrazone; 2,5-bis(p-diethylaminophenyl)-1,3,4-oxadiazole; pyrazolines such as 1-phenyl-3-(p-diethylaminostyryl)-5-(p-diethylaminophenyl) pyrazoline, 1-[quinolyl(2)]-3-(p-diethylaminostyryl)-5-(p-diethylaminophenyl)-pyrazoline, and 1-[pyridyl(2)]-3-(p-diethylaminostyryl)-5-(p-diethylaminophenyl) pyrazoline; oxazoles such as 2-(p-diethylaminostyryl)-6-diethylaminobenzoxazole, and 2-(p-diethylaminophenyl)-4-(p-dimethylaminophenyl)-5-(2-chlorophenyl) oxazole; thiazoles such as 2-(p-diethylaminostyryl)-6-diethylaminobenzothiazole; triaryl methanes such as bis(4-diethylamino-2-methylphenyl)-phenylmethane; polyacrylalkanes such as 1,1-bis(4-N,N-diethylamine-2-methylphenyl) heptane and 1,1,2,2-tetrakis(4-N,N-dimethylamine-2-methylphenyl) ethane; triphenylamine; poly(n-vinylcarbazole), polyvinylpyrene, polyvinylanthracene, polyvinylacridine, poly-9-vinylphenylanthracene, pyrene-formaldehyde resin, and ethylcarbazole-formaldehyde resin. The charge-transporting materials of this invention are not limited to the above-cited compounds and can be used single or in combination of two or more. Thickness of the charge transport layer is 5 to 30μ, preferably 8 to 20μ.

The binders for use in the charge transport layer include acrylic resins, polystyrene, polyesters, and polycarbonates. The above-cited hole-transporting polymers such as poly(N-vinylcarbazole) can be used as a binder for low molecular weight hole-transporting materials. On the other hand, there may be used polymers prepared from electro-transporting monomers such as disclosed in U.S. Pat. No. 4,122,113 as a binder for low molecular weight electron-transporting materials.

When the photosensitive member comprising a conductive layer, charge generation layer, and charge transport layer laminated in this order is operated, the surface of the charge transport layer needs to be positively charged if it is formed from an electron-transporting material. On image exposure of the photosensitive member after charging, electrons generated in the light-exposed area of the charge generation layer are injected into the charge transport layer and then arrive at the surface, where the positive charges are neutralized with the electrons to decay the surface potential, thus producing an electrostatic contrast between the light-exposed and light-unexposed areas. The produced electrostatic latent image, on development with a negative toner, turns into a visible image, which can be directly fixed or transferred to paper or plastic film, thereafter being fixed. It is also possible that the electrostatic latent image on the photosensitive member is transferred to the insulating layer of transfer paper, then developed, and fixed. Any of known developers, development processes, and fixing processes may be adopted, viz. there are no particular restrictions thereupon.

On the other hand, if the charge transport layer is formed from a hole-transporting material, its surface needs to be negatively charged. On image exposure of the photosensitive member negatively charged, holes generated in the light-exposed area of the charge generation layer act similarly to the electrons mentioned above, resulting in an electrostatic latent image. For developing this image, the use of a positive toner is necessary contrary to the case of the electron-transporting material-based photosensitive member.

Other types of photosensitive member can be prepared from the disazo pigment of this invention as follows:

A photosensitive member of type (1) is prepared by dispersing a disazo pigment of formula (I) in a solution of such an insulating binder as used for the charge transport layer of the type (3) of photosensitive member and coating the resulting dispersion on a conductive substrate, followed by drying.

A photosensitive member of type (2) is prepared by dissolving a charge-transporting material and an insulating binder, both being similar to those for use in the charge transport layer of the type (3) of photosensitive member, in a suitable solvent, dispersing a disazo pigment of formula (I) in the resulting solution, and coating the resulting dispersion on a conductive substrate, followed by drying.

Since a charge transfer complex is prepared by combining an electron-transporting material and a hole-transporting material, both being mentioned referring to the type (3) of photosensitive member, a photosensitive member of type (4) is prepared by forming a solution of the above-mentioned charge transfer complex, dispersing a disazo pigment of formula (I) in the resulting solution, and coating the dispersion on a conductive substrate, followed by drying.

For any of these types of photosensitive member, at least one disazo pigment represented by formula (I) is used, and if necessary, another pigment different in light absorption spectrum from the disazo pigment can be used in combination with the disazo pigment to enhance the sensitivity of photosensitive member, two or more disazo pigments represented by formula (I) can be used in combination for the purpose of obtaining a panchromatic photosensitive member, or the disazo pigment can be used in combination with a charge-generating material selected from known dyes and pigments.

The electrophotographic photosensitive member of this invention can be used not only in electrophotographic copying machines but also over a wide field of electrophotographic applications such as those to laser printers and CRT printers.

The process for preparing the disazo pigment used in this invention will be illustrated with reference to the following Preparative Example:

Preparative Example

Preparation of the Following Pigment No. 1

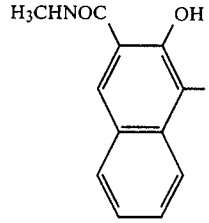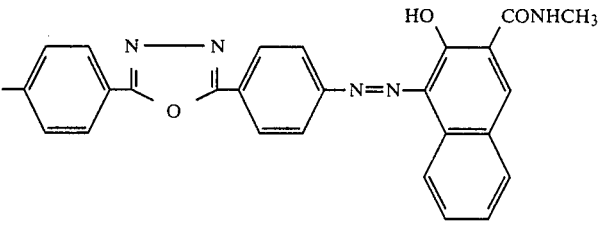

A solution of 3.54 g (0.051 mol) of sodium nitrite in 10.6 ml of water was added dropwise to a solution of 6.30 g (0.025 mol) of 2,5-bis(p-aminophenyl)-1,3,4-oxadiazole in a mixture of 63 ml of water and 13.24 ml (0.15 mol) of concentrated hydrochloric acid, during 5 minutes while keeping the liquid temperature at 4.5°–7° C., and the mixture was stirred at the same temperature for 30 more minutes.

The resulting tetrazotized solution was added dropwise to a solution of 10.57 g (0.0525 mol) of 3-hydroxy-naphthalene-2-carboxylic acid methylamide and 16.8 g (0.42 mol) of sodium hydroxide in 420 ml of water, during 10 minutes while keep the liquid temperature at 4°–10° C. The mixture was stirred at the same temperature for 2 more hours and allowed to stand overnight.

The resulting precipitate, filtered, washed, and dried, was extracted with methyl ethyl ketone for 20 hours using a Soxhlet extractor, giving 13.56 g of a reddish brown dry pigment; yield 80%, decomp. pt. 22 280° C.

IR absorption spectrum: amide 1660 $cm^{-1}$.

Visible absorption spectrum: λmax 556 nm(in o-dichlorobenzene).

Analysis, for $C_{38}H_{28}N_8O_5$: Calcd. (%) C 67.44, H 4.18, N 16.56; Found (%) C 67.47, H 4.16, N 16.49.

Other disazo pigments used in this invention can be prepared in the same way.

The following Examples illustrate preferred embodiments of the electrophotographic photosensitive members of the disazo pigment according to this invention:

EXAMPLES 1–16

An aqueous solution of poly(vinyl alcohol) was coated on aluminum plates 100μ thich and dried to form a bond layer of coating weight 0.8 g/m² on each plate.

Then, a dispersion of 5 g each of the pigments shown in Table 1 in a mixture of 10 g of a polyester solution (resistered trade mark: Polyester, Adhesive 49,000; mfd. by DuPont de Nemours & Co.; solid content 20 wt %) and 80 ml of tetrahdrofuran was coated on each bond layer and dried to form a charge generation layer of coating weight 0.20 g/m².

A solution of 5 g of [pyridyl-(2)]-3-(p-diethylaminostyryl)-5-(p-diethylaminophenyl) pyrazoline (designated as charge-transporting material No. 1) and 5 g of a poly(methyl methacrylate) (number average mol. wt. about 100,000) in 70 ml of benzene was coated on each charge generation layer and dried to form a charge transport layer of coating weight 10 g/m².

Electrophotographic photosensitive members prepared in this way were corona-charged at ⊖5 KV in the static fashion by using an electrostatic copying paper testing machine (Model SP-428, mfd. by Kawaguchi Denki K. K.), retained for 10 seconds in the dark, and exposed to light at an intensity of 5 lux to examine their charge bearing characteristics. The results are shown in Table 1, wherein Vo is the original potential ⊖volt), Rv is the potential retention (%) after standing for 10 seconds in the dark, and E ½ is exposure quantity for halving the original potential.

TABLE 1

| | | Charge bearing characteristics | | |
|---|---|---|---|---|
| Example No. | Pigment No. | Vo (⊖V) | Rv (%) | E ½ (lux · sec) |
| 1 | 1 | 530 | 88 | 4.5 |
| 2 | 2 | 550 | 88 | 5.3 |
| 3 | 3 | 520 | 90 | 5.5 |
| 4 | 4 | 540 | 92 | 5.7 |
| 5 | 5 | 520 | 88 | 4.6 |
| 6 | 6 | 500 | 87 | 5.4 |
| 7 | 7 | 540 | 91 | 4.5 |
| 8 | 8 | 510 | 88 | 4.6 |
| 9 | 9 | 460 | 87 | 4.7 |
| 10 | 10 | 480 | 90 | 4.5 |
| 11 | 11 | 500 | 88 | 4.7 |
| 12 | 12 | 510 | 90 | 5.3 |
| 13 | 13 | 530 | 91 | 4.6 |
| 14 | 14 | 490 | 89 | 4.9 |
| 15 | 15 | 520 | 88 | 4.8 |
| 16 | 16 | 540 | 89 | 4.7 |

COMPARATIVE EXAMPLES A–J

Similarly as in Example 1, photosensitive members were prepared using the pigments shown in Table 2 and their charge bearing characteristics were examined. The results are shown in Table 3.

It can be seen by comparing charge bearing characteristics of the Examples with those of the Comparative Examples that the disazo pigments of this invention, having an amide structure substituted by linear alkyl in the coupler component, give much higher photosensitivity than do the prior art disazo pigments having an amide structure substituted by aryl, aryl and alkyl, branched alkyl, or substituted alkyl in the coupler component.

TABLE 2

| Comparative Example No. | Pigment No. | Formula of pigment |
|---|---|---|
| A | a | |
| B | b | |

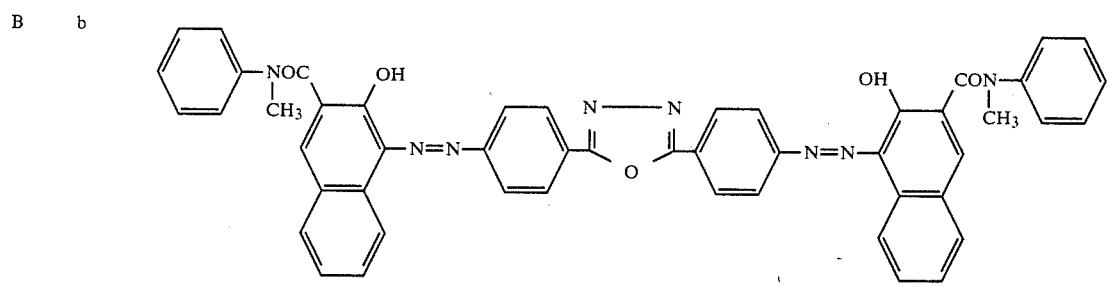

TABLE 2-continued

| Comparative Example No. | Pigment No. | Formula of pigment |
|---|---|---|
| C | c | Bis-azo pigment with HOH₄C₂—HNOC and —CONH—C₂H₄OH terminal groups on 3-hydroxy-2-naphthamide units, linked via —N=N—C₆H₄—C(=N—N=)—O—C(=)—C₆H₄—N=N— (1,3,4-oxadiazole) bridge. |
| D | d | Same bridge as C with (CH₃)₂CH—HNOC and —CONH—CH(CH₃)₂ (isopropylamide) terminal groups. |
| E | e | Same bridge with (CH₃)₂CH—CH₂—HNOC and —CONH—CH₂—CH(CH₃)₂ (isobutylamide) terminal groups. |
| F | f | Same bridge with C₂H₅—CH(CH₃)—HNOC and —CONH—CH(CH₃)—C₂H₅ (sec-butylamide) terminal groups. |
| G | g | Same oxadiazole bridge with CH₃ substituents on the central phenyl rings and C₆H₅—HNOC / —CONH—C₆H₅ (phenylamide) terminal groups. |
| H | h | Same oxadiazole bridge with Cl substituents on the central phenyl rings and C₆H₅—N(CH₃)OC / —CON(CH₃)—C₆H₅ (N-methyl-N-phenylamide) terminal groups. |

TABLE 2-continued

| Comparative Example No. | Pigment No. | Formula of pigment |
|---|---|---|
| I | i | (structure shown) |
| J | j | (structure shown) |

TABLE 3

| Comparative Example No. | Pigment No. | Charge bearing characteristics | | |
|---|---|---|---|---|
| | | Vo (⊖V) | Rv (%) | E½ (lux · sec) |
| A | a | 520 | 87 | 8.3 |
| B | b | 540 | 90 | 11.4 |
| C | c | 500 | 78 | 31 |
| D | d | 530 | 86 | 25 |
| E | e | 510 | 88 | 27 |
| F | f | 510 | 89 | 29 |
| G | g | 500 | 90 | 8.1 |
| H | h | 540 | 92 | 8.6 |
| I | i | 490 | 86 | 8.2 |
| J | j | 500 | 88 | 8.0 |

EXAMPLE 17

A solution of 5 g of 2,4,7-trinitrofluorenone (charge-transporting material No. 2) and 5 g of a polycarbonate of bisphenol A(viscosity average mol. wt. about 30,000) in 70 ml of tetrahydrofuran was coated on the charge generation layer prepared in Example 1 and was dried to form charge transport layer of coating weight 12 g/m².

Charge bearing characteristics of the photosensitive member thus obtained were tested in the same way as in Example 1 except that the charging polarity was positive. The results are as follows:

| Vo | ⊕ 520 V |
|---|---|
| Rv | 86% |
| E½ | 8.3 lux · sec |

EXAMPLES 18–30

A dispersion of 5 g of pigment No. 1, which was used in Example 1, in a solution of 2 g of a butyral resin (degree of butyral conversion: 63 mol %) in 95 ml of ethanol was coated on the aluminum vacuum-deposited on a Mylar film and dried to form a charge generation layer of coating weight 0.2 g/m². A solution of 5 g of a charge-transporting material shown in Table 4 and 5 g of a phenoxy resin(registered trade mark: Bakelite PKHH; mfd. by Union Carbide Corp.) in 70 ml of tetrahydrofuran was coated on the above charge generation layer and dried to form a charge transport layer of coating weight 11 g/m².

In this way, photosensitive members containing different charge-transporting materials were prepared and tested for charge bearing characteristics in a similar manner to that described in Example 1. The results are shown in Table 5. All the photosensitive members exhibited excellent electrophotographic sensitivity.

TABLE 4

| Example No. | Charge-transporting material No. | Formula |
|---|---|---|
| 18 | 3 | (H5C2)2N-C6H4-C(=N-N=)-C6H4-N(C2H5)2 with O bridge |
| 19 | 4 | Phenothiazine derivative with N-C2H5, CH=N-N(C6H5)2 |
| 20 | 5 | Pyrrolidino-C6H4-CH=N-N(C6H5)2 |
| 21 | 6 | (H5C2)2N-C6H4-CH=N-N(C6H5)(1-naphthyl) |
| 22 | 7 | (H3C)2N-C6H4-C(=N-N(C6H5)2)-C6H4-N(CH3)2 |
| 23 | 8 | 1,3,3-Trimethyl-2-(CH=CH-N(C6H5)2)-indoline |
| 24 | 9 | (H5C2)2N-C6H4-CH(pyrazoline)-C(=CH-C6H4-N(C2H5)2), N-phenyl |

TABLE 4-continued

| Example No. | Charge-transporting material No. | Formula |
|---|---|---|
| 25 | 10 | (structure: bis-diethylaminophenyl hydrazone with methoxypyridinyl group) |
| 26 | 11 | (structure: bis-diethylaminophenyl hydrazone with quinolinyl group) |
| 27 | 12 | (structure: bis(diethylamino-methylphenyl)phenylmethane) |
| 28 | 13 | (structure: bis(diethylamino-methylphenyl)hexylmethane) |
| 29 | 14 | (structure: diethylamino-benzoxazole-CH=CH-diethylaminophenyl) |
| 30 | 15 | (structure: N-methylbenzothiazole-N=N=CH-diethylaminophenyl) |

TABLE 5

| | Charge bearing characteristics | | |
|---|---|---|---|
| Example No. | Vo (−V) | Rv (%) | E½ (lux · sec) |
| 18 | 560 | 93 | 4.6 |
| 19 | 480 | 88 | 4.4 |
| 20 | 510 | 87 | 4.6 |
| 21 | 490 | 86 | 4.3 |
| 22 | 520 | 89 | 4.4 |
| 23 | 500 | 90 | 3.5 |
| 24 | 530 | 91 | 4.8 |
| 25 | 540 | 92 | 4.4 |
| 26 | 500 | 88 | 4.6 |
| 27 | 520 | 90 | 5.3 |
| 28 | 540 | 92 | 6.2 |
| 29 | 500 | 86 | 4.9 |
| 30 | 510 | 84 | 4.2 |

EXAMPLE 31

A solution of casein in aqueous ammonia was coated on an aluminum plate 100μ thick and dried to form a bond layer of coating weight 1.0 g/m².

One gram of the same pigment, No. 9, as used in Example 9 was dispersed in a solution of 5 g of 2-(p-diethylaminophenyl)-4-(p-dimethylaminophenyl)-5-(2-chlorophenyl)oxazole(charge-transporting material No. 16) and 5 g of a poly(N-vinylcarbazole) (number average mol. wt. about 300,000) in 70 ml of tetrahydrofuran. The dispersion was coated on the above bond layer and dried to form a layer of coating weight 11 g/m².

The photosensitive member thus prepared was tested for charge bearing characteristics in the same manner as in Example 1 except that the charging polarity was positive. The results are as follows:

|  |  |  |
|---|---|---|
| Vo | ⊕ | 560 V |
| Rv |  | 84% |
| E ½ |  | 10.0 lux · sec |

EXAMPLE 32

One gram of the same pigment, No. 5, as used in Example 5 was dispersed in a solution of 5 g of the same charge-transporting material, No. 7 as used in Example 22 and 5 g of an isophthalic acid-terephthalic acid (1:1) co-polyester of bisphenol A in 70 ml of tetrahydrofuran. The dispersion was coated on the bond layer prepared in Example 29 and was dried to form a layer of coating weight 12 g/m².

The photosensitive member thus prepared was tested for charge bearing characteristics in the same manner as in Example 1 except that the charging polarity was positive. The results are as follows:

|  |  |  |
|---|---|---|
| Vo | ⊕ | 480 V |
| Rv |  | 86% |
| E ½ |  | 11.6 lux · sec |

EXAMPLES 33–35

Photosensitive drums (Nos. 30–32) were prepared by coating hollow aluminum cylinders of 120 mm in diameter successively with a bond layer, charge generation layer, and charge transport layer each, using the same materials as in Examples 1, 2 and 5, respectively.

These drums were tested for durability by using an electrophotographic copying machine (Model SC-120 mfd. by Copyer Kabushiki Kaisha was modified), where the initial dark area potential was set at ⊖550 V and a one-component magnetic developer was used. As a result, all the drums gave beautiful copies with high fidelity even after production of 20,000 copies.

COMPARATIVE EXAMPLES K–M

Photosensitive drums K–M were prepared by forming photosensitive layers on aluminum hollow cylinders of 120 mm in diameter using the same materials as in Comparative Examples A, B and G, respectively.

In the same way as in Examples 33–35, durability test of these drums were conducted, with the result that decrease in image density and stains in the blank areas became remarkable after about 8000 copies had been produced in each of these cases.

We claim:

1. An electrophotographic photosensitive member having a conductive support and a layer containing a charge transport material and a layer containing at least one disazo pigment represented by the following Formula (I):

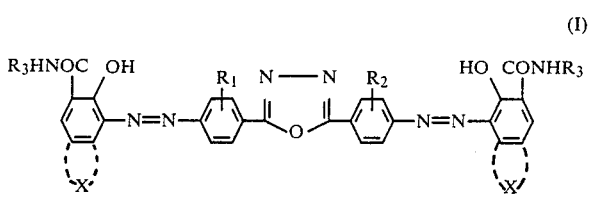

wherein each of $R_1$ and $R_2$ is selected from the group consisting of hydrogen, halogen, lower alkyl, or lower alkoxy; $R_3$ is selected from the group consisting of methyl, ethyl or $C_3$–$C_{10}$ linear alkyl; and X is selected from the group of residues necessary to complete an aromatic hydrocarbon ring or heterocyclic ring, substituted or unsubstituted.

2. An electrophotographic photosensitive member of claim 1, wherein $R_3$ in the formula (I) is selected from the group consisting of methyl or ethyl.

3. An electrophotographic photosensitive member of claim 2, wherein said disazo pigment is represented by the following formula:

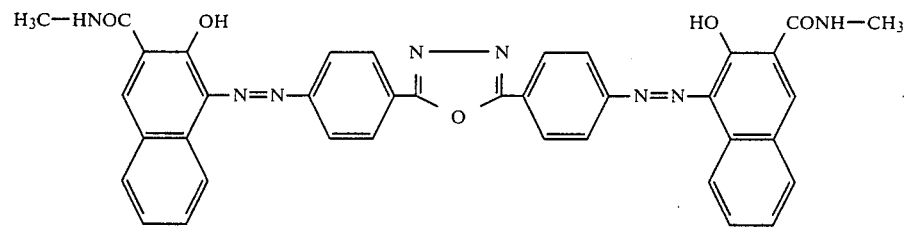

4. An electrophotographic photosensitive member of claim 2, wherein said disazo pigment is represented by the following formula:

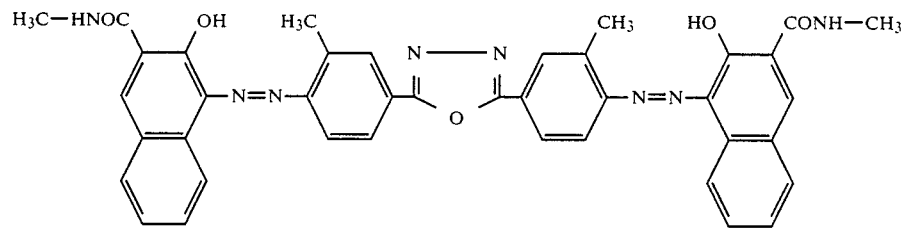

5. An electrophotographic photosensitive member of claim 2, wherein said disazo pigment is represented by the following formula:

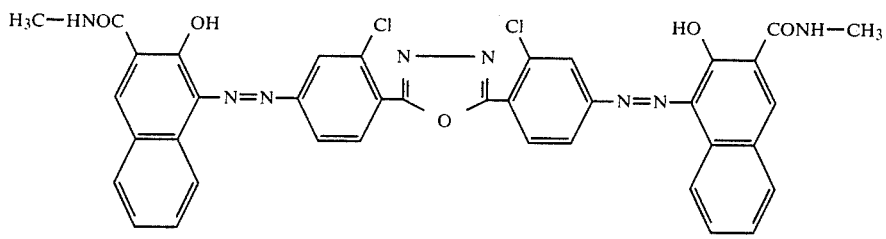

6. An electrophotographic photosensitive layer of claim 1, wherein said charge transport layer contains an electron-transporting material.

7. An electrophotographic photosensitive member of claim 1, wherein said charge transport layer contains a hole-transporting material.

8. An electrophotographic photosensitive member of claim 7, wherein said hole-transporting material is a compound selected from the group consisting of hydrazones, pyrazolines, oxazoles, thiazoles, triarylmethanes or polyarylalkanes.

9. An electrophotographic photosensitive member of claim 8, wherein said hole-transporting material is hydrazone compound.

10. An electrophotographic photosensitive member of claim 1, wherein the layer containing at least one disazo pigment represented by the formula (I) is laid on the conductive support and the charge transport layer is laid on the layer containing at least one disazo pigment represented by the formula (I).

11. An electrophotographic photosensitive member of claim 10, which has a bond layer between the conductive support and said layer containing at least one disazo pigment represented by the formula (I).

* * * * *